United States Patent
Neumaier et al.

(10) Patent No.: US 8,903,537 B2
(45) Date of Patent: Dec. 2, 2014

(54) METHODS AND APPARATUS FOR GENERATING CONTROL DATA FOR FORMING A TOOTH OF A SPUR GEAR TOOTHING BY MILLING A WORKPIECE AT A MACHINE TOOL

(75) Inventors: Josef Neumaier, Pfronten (DE);
Thomas Lochbihler, Vils (AT);
Uwe-Carsten Hansen, Eisenberg (DE)

(73) Assignee: DECKEL MAHO Pfronten GmbH, Pfronten (DE)

( * ) Notice: Subject to any disclaimer, the term of this patent is extended or adjusted under 35 U.S.C. 154(b) by 444 days.

(21) Appl. No.: 13/212,756

(22) Filed: Aug. 18, 2011

(65) Prior Publication Data

US 2012/0072009 A1 Mar. 22, 2012

(30) Foreign Application Priority Data

Aug. 18, 2010 (DE) .......................... 10 2010 039 490

(51) Int. Cl.
*G05B 19/18* (2006.01)
*B23F 1/06* (2006.01)

(52) U.S. Cl.
CPC .................................. *G05B 19/182* (2013.01)
USPC .............................. 700/159; 700/182; 703/1

(58) Field of Classification Search
USPC ............... 700/95, 97, 98, 159, 160, 164, 180, 700/182, 186, 187, 195; 451/5, 8, 11, 28, 451/57, 58; 703/1, 7
See application file for complete search history.

(56) References Cited

U.S. PATENT DOCUMENTS 6,080,199 A * 6/2000 Umeyama et al. ................. 703/1
6,128,969 A * 10/2000 Litvin et al. ..................... 74/458
(Continued)

FOREIGN PATENT DOCUMENTS

DE 10 2009 008 124 8/2010
WO 2008/045572 4/2008
WO 2008/133517 11/2008

OTHER PUBLICATIONS

Hans-Peter Schossig, "Auf einfachem Weg zu guten Zähnen—Zahnräder mit hoher Qualität auf Standardmaschinen fräsen" ["The Easy Way to Good Teeth—Mill High-Quality Gear Wheels on Standard Machines"] (published in the journal Werkstatt Und Betrieb, Carl Hanser Verlag, Munich, edition 2007, No. 4/28, ISSN 0043-2792, pp. 28-30 and 32 (1 page of English language summary included).

(Continued)

*Primary Examiner* — Charles Kasenge
(74) *Attorney, Agent, or Firm* — Hanley, Flight and Zimmerman, LLC

(57) ABSTRACT

A disclosed example method for generating control data for forming a tooth of a spur gear toothing which has an intended widthwise crowning by milling a workpiece at a numerically controlled machine tool having at least 5 axes, at a universal machine tool, by successively moving a milling cutter of the machine tool along a plurality of machining paths based on the generated control data, involves providing a tooth flank geometry of at least one tooth flank of the tooth of the spur gear toothing. The method also involves determining parameters for specifying a change of the provided tooth flank geometry according to the intended widthwise crowing of the tooth. In addition, the method involves generating control data based on a tooth flank geometry which is changed based on the determined parameters, wherein the changed tooth flank geometry corresponds to a tooth flank geometry of the tooth having the intended widthwise crowing.

15 Claims, 6 Drawing Sheets

(56) References Cited

U.S. PATENT DOCUMENTS

| | | | |
|---|---|---|---|
| 6,282,502 B1* | 8/2001 | Sundaresan et al. | 703/1 |
| 7,274,975 B2 | 9/2007 | Miller | |
| 7,869,904 B2 | 1/2011 | Cannon et al. | |
| 8,307,551 B2* | 11/2012 | Kotthoff | 29/893.3 |
| 8,340,806 B2* | 12/2012 | Kotthoff et al. | 700/148 |
| 8,402,659 B2* | 3/2013 | Kotthoff | 29/893.32 |
| 2001/0043050 A1 | 11/2001 | Fisher, Jr. | |
| 2002/0158360 A1 | 10/2002 | Joseph | |
| 2002/0167282 A1 | 11/2002 | Kirkpatrick et al. | |
| 2005/0159938 A1* | 7/2005 | Shigemi et al. | 703/7 |
| 2005/0171631 A1* | 8/2005 | Arvin | 700/182 |
| 2008/0134507 A1* | 6/2008 | Kotthoff | 29/893.36 |
| 2008/0152940 A1* | 6/2008 | Kotthoff | 428/610 |
| 2008/0201951 A1* | 8/2008 | Kotthoff | 29/893.37 |
| 2008/0209730 A1* | 9/2008 | Kotthoff | 29/893.3 |
| 2010/0204814 A1* | 8/2010 | Neumaier et al. | 700/97 |
| 2010/0225452 A1 | 9/2010 | Murdoch | |
| 2012/0072008 A1 | 3/2012 | Neumaier et al. | |

OTHER PUBLICATIONS

KISSsoft AG., "KISSsoft Release Oct. 2008 Benutzerhandbuch," KISSsoft Berechnungsprogramme für den Maschinenbau, S. I-35, II-45,—66 bis II-75 [http://www.scope-online.de/upload_hopenstedt/Kisssoft_Benutzerhandbuch_620187.pdf], Oct. 2008 (857 pages).

* cited by examiner

US 8,903,537 B2

METHODS AND APPARATUS FOR GENERATING CONTROL DATA FOR FORMING A TOOTH OF A SPUR GEAR TOOTHING BY MILLING A WORKPIECE AT A MACHINE TOOL

RELATED APPLICATIONS

This patent claims priority to German Patent Application No. 10 2010 039 490.4, filed on Aug. 18, 2010, which is hereby incorporated by reference herein in its entirety.

FIELD OF THE DISCLOSURE

The present disclosure relates generally to machine tools and, more particularly, to methods and apparatus for generating control data for forming a tooth of a spur gear toothing by milling a workpiece at a machine tool.

BACKGROUND

Regarding the manufacturing of workpieces having a spur gear toothing, it is known from the prior art to manufacture spur gears or other workpieces having a spur gear toothing at one-purpose-machines which are specialized gear cutting machines that are solely designed for machining workpieces having a spur gear toothing. Such specialized gear cutting machines are to be distinguished from universal machine tools.

For example, in the prior art, regarding specialized gear cutting machines there are known gear hobbing machines or gear grinding machines for forming a tooth profile on a workpiece by controlling a gear profile hobbing tool or a gear profile grinding plate so as to form tooth flanks or teeth on the workpiece. The gear profile hobbing tools and the gear profile grinding plates already have a cross-sectional shape corresponding to the profile shape of the tooth flanks to be formed. By controlling the gear profile hobbing tools or the gear profile grinding plates along one machining track through the workpiece, depending on the profile shape of the gear profile hobbing tools or the gear profile grinding plates, already one or even two opposing tooth flanks are formed having a tooth profile according to the shape of the tool.

Such a method for manufacturing of workpieces having a gear toothing on so-called standard machine tools or universal machine tools such as, for example, milling machine tools, universal milling machine tools or machining centers is, for example, described in the article "Auf einfachem Weg zu guten Zähnen-Zahnräder mit hoher Qualität auf Standardmaschinen fräsen" (engl.: A simple way to good teeth-milling gears on standard machine tools at high quality) by Hans-Peter Schossig (published in the magazine WERKSTATT UND BETRIEB (engl.: WORKSHOP AND ENTERPRISE), Carl Hanser Verlag, Munich, No. Apr. 28, 2007, p. 28-32, ISSN 0043-2792) and further also in WO 2008/133517A1. Other techniques (see, e.g., DE 10 2009 008 124) have been developed by the Assignee of the present application.

DETAILED DESCRIPTION

Figure 1:
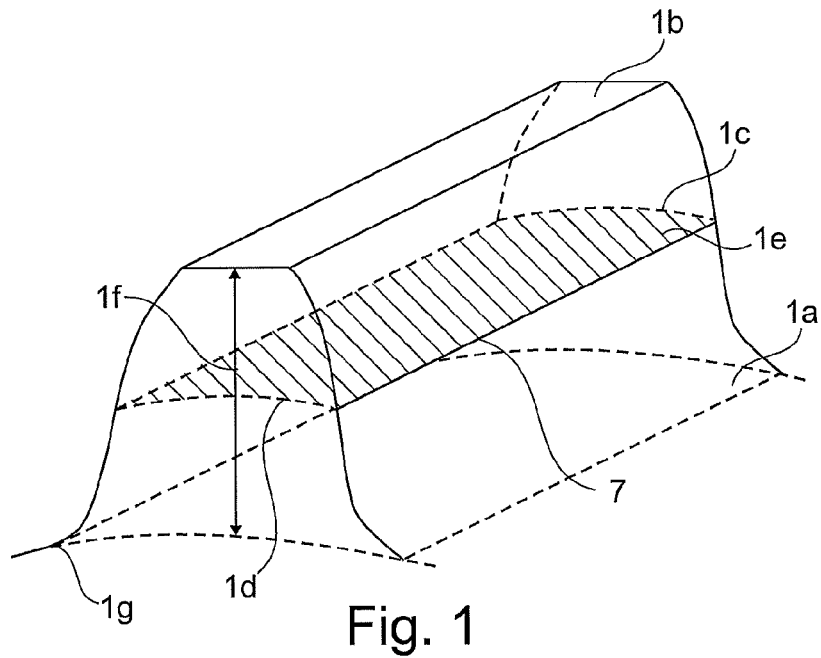
FIG. 1 shows an example schematic perspective view of a tooth of a spur gear toothing of a workpiece.

In the following, disclosed examples are described in detail with reference to the attached Figures. However, the scope of coverage of this patent is not limited to the examples disclosed herein. To the contrary, this patent covers all methods, apparatus, systems, and articles of manufacture fairly falling within the scope of the appended claims either literally or under the doctrine of equivalents. In the Figures, same or similar features of the disclosed examples are denoted by the same reference numerals.

Contrary to the above-mentioned manufacturing methods utilizing such specialized gear cutting machines, i.e. one-purpose-machines such as gear hobbing machines or gear grinding machines, example methods are disclosed for manufacturing workpieces having a gear toothing (in particular a spur gear toothing) at numerically controlled machine tools comprising at least 5 axes, in particular at universal machine tools such as, for example milling machine tools, universal milling machine tools or machining centers, in which the gear toothing on the workpiece is formed by standard milling cutters such as, for example, end milling cutters with or without corner radius, by successive machining, and in particular line-by-line machining, in which the milling cutter performs successive movement, and in particular line-by-line movement, along machining tracks for successively forming the tooth flank on the workpiece.

Example methods and apparatus are disclosed herein for generating control data for forming a tooth of a spur gear toothing by milling a workpiece at a numerically controlled machine tool comprising at least 5 axes, in particular at a universal machine tool, by successive movement, in particular line-by-line movement, of a milling cutter of the machine tool along machining tracks based on the generated control data.

In particular, example methods and apparatus are disclosed for generating control data for forming a tooth of a spur gear toothing by milling a workpiece at a numerically controlled universal machine tool comprising at least 5 axes such as, for example, a milling machine tool, an universal milling machine tool, or a machining center, wherein the tooth flank is formed according to a predetermined tooth flank geometry by line-by-line movement of a milling cutter of the machine tool along machining tracks which are indicated by the control data so as to cut material from the workpiece line-by-line for forming the tooth flank.

Further, example methods and apparatus are disclosed for generating control data for manufacturing a workpiece having a gear toothing by providing toothing information data, calculating a model of the workpiece based on the provided toothing information data comprising calculating a predetermined tooth flank geometry based on the provided toothing information data, and generating control data for manufacturing the workpiece comprising generating control data for forming at least one tooth of a spur gear toothing on the workpiece.

Further, disclosed example numerically controlled universal machine tools comprise at least 5 axes, in particular to a universal machine tool such as, for example, a milling machine tool, an universal milling machine tool, or a machining center, for milling a workpiece by successive movement, in particular line-by-line movement, of a milling cutter of the machine tool along machining tracks based on generated control data, wherein the machine tool comprises an apparatus for generating control data.

Further, disclosed example computer program products comprise a computer program means which is stored on a computer readable storage medium, the computer program means comprising execution means to be executed by a data processing means of a data processing apparatus such that the data processing apparatus forms an apparatus for generating control data and/or such that the data processing apparatus is configured for performing a method of generating control data.

Example methods and apparatus disclosed herein simplify the machining, processing or manufacturing of workpieces having a spur gear toothing and to expand the capabilities of milling a workpiece at a numerically controlled machine tool comprising at least 5 axes, in particular at universal machine tools such as milling machine tools, universal milling machine tools or machining centers. In particular, example methods and apparatus are disclosed for generating control data which improves the application spectrum of the newly developed unconventional methods for manufacturing workpieces having a gear toothing at numerically controlled machine tools comprising at least 5 axes, in particular at universal machine tools, in which the gear toothing on the workpiece is formed by successive machining, and in particular line-by-line machining, of a tooth flank on the workpiece based on the generated control data. In particular, disclosed examples enable simple and efficient manufacturing of a workpiece having a spur gear toothing such that at least one tooth of the workpiece is formed according to an intended crowning.

Example methods are disclosed for generating control data for forming a tooth of a spur gear toothing which has an intended widthwise crowning by milling a workpiece at a numerically controlled machine tool having at least 5 axes, in particular at a universal machine tool such as, for example, a milling machine tool, a universal milling machine tool or a machining center, by successively moving a milling cutter of the machine tool along a plurality of machining paths, in particular line-by-line, based on the generated control data.

Disclosed example methods may comprise providing a tooth flank geometry of at least one tooth flank of the tooth of the spur gear toothing, determining parameters for specifying a change of the provided tooth flank geometry according to the intended widthwise crowing of the tooth, and generating control data based on a tooth flank geometry which is changed based on the determined parameters, wherein the changed tooth flank geometry corresponds to a tooth flank geometry of the tooth having the intended widthwise crowing.

In some such disclosed examples, a tooth flank geometry is provided, such as, e.g., a mathematically exact or theoretical tooth flank geometry, corresponding to provided information of data being indicative of the tooth flank geometry or defining the tooth flank geometry such as information or data being indicative of a toothing type (e.g. straight toothing, helical toothing, circular toothing, spiral toothing, or the like), a shape and/or geometry of the workpiece, toothing shape or profile shape (e.g. involutes profile shape, cycloidal profile shape, circular profile shape, or the like), etc. Based on such information or data, the mathematical exact or theoretical tooth flank geometry can be numerically calculated, for example, by means of a CAD-program (CAD for computer-aided design).

However, in some disclosed examples, control data is not directly generated based on the provided tooth flank geometry or a model of the provided tooth flank geometry (as might be the case according to DE 10 2009 00814), but some disclosed examples additionally comprise determining parameters for specifying a change of the provided tooth flank geometry according to an intended widthwise crowing of the tooth.

Then, a modified or changed tooth flank geometry is calculated based on the determined parameters for specifying the change of the provided tooth flank geometry and depending on the provided tooth flank geometry, wherein control data is generated based on the changed tooth flank geometry according to some disclosed examples.

This provides the advantage that machining the workpiece at the machine tool is performed based on control data already in correspondence with the changed tooth flank geometry so that the manufactured workpiece has a tooth flank or tooth flanks having an actual tooth flank shape according to the changed tooth flank geometry already after machining for forming the tooth flank(s). Consequently, the manufactured workpiece exhibits already directly after the machining one or more teeth having one or two modified tooth flanks so that the manufactured workpiece already comprises one or more teeth having the intended widthwise crowning after the machining at the machine tool. Time consuming and inconvenient additional post-processing of a tooth flank or tooth flanks, for example for forming the intended widthwise crowning shape, is not required. By contrast, the tooth/teeth can be directly processed based on the control data such that the intended widthwise crowning of the tooth/teeth can be achieved without any required post-processing. The term "widthwise crowning" of a tooth of the spur gear toothing means that the tooth has a tooth thickness (in pitch direction) that decreases towards one or both of the outer sides of the spur gear tooth.

Accordingly, disclosed examples allow modifying or changing the tooth flank geometry of a tooth of a spur gear toothing which corresponds to a mathematical exact or theoretical tooth flank geometry already prior to the generation of control data in a simple and efficient manner, for example, in accordance with an intended widthwise crowning.

Consequently, disclosed examples allow significantly improving and expanding the versatility and application possibilities of newly developed methods for manufacturing a workpiece having a toothing at numerically controlled machine tools having at least 5 axes by successively moving a milling cutter of the machine tool along a plurality of machining paths, in particular by line-by-line movement of a milling cutter along substantially parallel lines of machining paths extending along the tooth flank, by means of a milling cutter such as an end mill cutting tool or the like.

In particular, the manufacturing of spur gears can be significantly improved and simplified and the application possibilities can be significantly expanded in comparison to commonly known manufacture processes at specialized gear cutting manufacturing machines such as one-purpose-machines, such as gear hobbing machines or gear grinding machines, because the forming of a modified tooth flank geometry which already exhibits the intended widthwise crowning can be performed directly based on generated control data. In the above-mentioned common manufacturing processes performed at specialized gear cutting machines such as one-purpose-machines, such as gear hobbing machines or gear grinding machines, the profile shape of the tooth is substantially pre-determined by the profile shape of the hobbing or grinding tools and, for forming the tooth flank, the tool typically only moves along one machining path (maybe multiple times) so that possibilities for modeling a tooth having a widthwise crowning is significantly limited such that time consuming and inconvenient post-processing of the tooth flank is required.

In some preferred examples, generating control data comprises calculating a model of the changed tooth flank geometry based on the provided tooth flank geometry and the determined parameters, in particular preferably, but not necessarily, calculating a model of the tooth of the spur gear toothing based on the provided tooth flank geometry and the determined parameters.

This provides the advantage that there can be provided/calculated a model according to the modified or changed tooth flank geometry, which differs from the mathematical exact or theoretical tooth flank geometry in accordance with the determined parameters for specifying a change of the provided tooth flank geometry, wherein control data can be generated in a simple and possibly automated manner based on the changed tooth flank geometry, the control data possibly comprising an NC-program or at least parts of an NC-program.

In some preferred examples, the parameters for changing the provided tooth flank geometry are determined such that a tooth having the changed tooth flank geometry exhibits the intended widthwise crowning.

In some preferred examples, determining parameters for specifying a change of the provided tooth flank geometry comprises determining one shift parameter for each of one or more defined shift positions of the at least one tooth flank of the provided tooth flank geometry.

This provides the advantage that the generation of control data for forming a tooth flank having the intended widthwise crowning in a simple manner only requires a user to input, determine or define respective shift parameters for each of the one or more defined shift positions so as to define the intended widthwise crowning for generating control data which already reflects the intended widthwise crowning.

In some preferred examples, the one or more shift positions are defined or arranged on a tooth flank curve of the at least one tooth flank, the tooth flank curve corresponding to a line of intersection of an intersection surface of the tooth and the at least one tooth flank of the provided tooth flank geometry.

This provides the advantage that the one or more shift positions are defined or arranged on the at least one tooth flank along a tooth flank curve so as to allow to define or input the intended widthwise crowning by simply inputting one or more shift parameters for positions along a tooth flank curve of the tooth flank, in particular preferably, but not necessarily, along a tooth flank curve which extends widthwise along the at least one tooth flank.

In some preferred examples, the intersection surface of the tooth is an intersection plane of the tooth, in particular preferably, but not necessarily, a horizontal intersection plane. In some preferred examples, the intersection plane is oriented tangential with respect to the pitch circle of the spur gear toothing, in particular wherein the intersection plane is preferably, but not necessarily, oriented tangential to the pitch circle of the spur gear toothing at a centric position of the intersection plane.

This provides the advantage that the shift parameters can be defined along a tooth flank curve, which extends widthwise on the at least one tooth flank, thereby substantially maintaining a same distance (height) to the tooth root or tooth head along the widthwise direction and additionally maintains substantially the same distances to the tooth root and the tooth head along the widthwise direction. Consequently, the shift parameters can be defined in centric positions on the tooth flank and substantially at the level of half of the tooth height, i.e. in particular close to or substantially at the same level as the pitch circle of the tooth of the spur gear toothing.

According to some alternative advantageous preferred examples, the intersection surface of the tooth extends along a cylindrical surface, the axis of the cylindrical surface preferably, but not necessarily, being oriented coaxially with respect to the rotational axis of the spur gear toothing. In some preferred examples, the intersection surface of the tooth extends along the pitch circle of the spur gear toothing.

According to such some alternative advantageous preferred examples, it is advantageously made possible to define the shift parameters in centric positions on the tooth flank and exactly at the level of half of the tooth height by defining or determining the shift parameters exactly at the same level as the pitch circle of the tooth of the spur gear toothing. Additionally, the shift positions are defined on the tooth flank at a maintained height, i.e., the distance to the tooth root or tooth head, and in particular at the level of half of the height between tooth root and tooth head.

In some preferred examples, the one or more shift positions are defined substantially at the same level as the pitch circle of the spur gear toothing.

In some preferred examples, the method further comprises determining or defining one or more shift positions on the provided tooth flank geometry.

This has the advantage that a further flexibility can be achieved in that it is not only enabled to define the amount of removal or shift of the tooth flank for forming the widthwise crowning by inputting shift parameters but it may additionally be enabled to also define the arrangement of shift positions on the provided tooth flank geometry.

If the shift positions shall be defined or selectively arranged on a tooth flank curve, determining or defining one or more shift positions on the provided tooth flank geometry can be conveniently performed by defining or determining of respective single parameters for each of the shift positions, for example, by determining parameters which respectively describe the distance of the corresponding shift position to the adjacent shift position or the tooth flank edge.

In some preferred examples, the changed tooth flank geometry is retracted at each of the one or more shift positions by an amount according to the determined shift parameters in comparison to the provided tooth flank geometry. This enables to define a widthwise crowning by defining a retraction of the tooth flank or tooth flank geometry at each of the shift positions according to the intended widthwise crowning.

In some preferred examples, the provided tooth flank geometry is changed such that the tooth profile of the tooth flank is shifted at each of the one or more shift positions by rotating the tooth profile about the rotational axis of the spur gear toothing according to the respective determined shift parameter.

This provides the advantage that the change or modification of the whole tooth profile can be conveniently defined in a simple manner at one specific shift position by inputting or determining only one shift parameter for this specific shift position in that the tooth profile is rotated at the specific shift position corresponding to the determined shift parameter about the rotational axis of the spur gear toothing so as to shift the profile at the specific shift position to obtain the changed tooth flank geometry.

Consequently, the changed tooth flank geometry can be obtained from the shifted profiles which are respectively obtained by rotation of the respective tooth profiles about the rotational axis of the spur gear toothing in accordance with the respective defined shift parameter at one or more shift positions, wherein the tooth flank geometry is preferably, but not necessarily, evenly and continuously interpolated in between adjacent shift positions such that even and continuous transitions, preferably, but not necessarily, tangential transitions, are obtained at each shift position.

In some preferred examples, the method further comprises displaying a model of the changed tooth flank geometry.

This provides the advantage that the changed tooth flank geometry can be visually examined by a user in order to allow to additionally adjust and/or correct determined shift positions and/or shift parameters prior to the generation of the control data based on the calculated model until the model has a tooth flank geometry according to the intended changed tooth flank geometry, i.e. a changed tooth flank geometry exhibiting the intended widthwise crowning, prior to generating the control data based on the changed tooth flank geometry having the intended widthwise crowning.

In some preferred examples, providing the tooth flank geometry comprises providing toothing information data, and calculating a provided tooth flank geometry based on the provided toothing information data.

In some preferred examples, the toothing information data comprises data being indicative of a size and shape of the workpiece, data being indicative of a toothing shape (toothing type), in particular indicative of a toothing shape of one of the toothing shapes including a straight toothing shape, a helical toothing gear shape and a spiral toothing shape, data being indicative of a profile shape of the tooth flank, in particular indicative of a profile shape of one of the profile shapes including an involutes profile shape, a cycloidal profile shape and a circular profile shape, data being indicative of a size and shape of a tooth geometry of the gear toothing, and/or data being indicative of a number of teeth of the gear toothing.

This provides the advantage that the provided tooth flank geometry can be provided in a simple manner by providing toothing information data, wherein providing, determining or inputting only little toothing information data is actually required for providing the complete tooth flank geometry or at least for enabling to calculate a model of a mathematically exact or theoretical tooth flank geometry. For example, the toothing information data may comprise data being indicative of a size and shape of the workpiece. Furthermore, toothing information data may be provided comprising data being indicative of an intended toothing shape (toothing type), for example, whether a straight toothing shape, a helical toothing gear shape and a spiral toothing shape shall be formed. Furthermore, toothing information data may be provided comprising data being indicative of an intended and possibly mathematically exact profile shape of the tooth flank, such as for example on of the profile shapes including an involutes profile shape, a cycloidal profile shape and a circular profile shape. Furthermore, toothing information data may be provided comprising data being indicative of a size and shape of a tooth geometry of the gear toothing and/or data being indicative of a number of teeth of the gear toothing.

In some preferred examples, toothing information data comprises data enabling calculating a mathematically exact or theoretical tooth flank geometry, in particular, by calculating a model of the provided tooth flank geometry or by calculating a model of the whole manufactured workpiece having the spur gear toothing comprising one or more spur gear teeth having the intended tooth flank geometry to be provided (i.e., preferably, but not necessarily, the provided without any crowning).

According to a second aspect of some disclosed examples, there is proposed a method for generating control data for manufacturing a workpiece having a gear toothing, comprising providing toothing information data, calculating a model of the workpiece based on the provided toothing information data, comprising calculating a provided tooth flank geometry based on the provided toothing information data, and generating control data for manufacturing the workpiece, comprising generating control data for forming a tooth of a spur gear toothing on the workpiece according to a method of the first aspect or at least one of the preferred examples described above.

According to a third aspect of some disclosed examples, example apparatus are disclosed for generating control data for forming a tooth of a spur gear toothing which has an intended widthwise crowning by milling a workpiece at a numerically controlled machine tool having at least 5 axes, in particular at a universal machine tool, by successively moving a milling cutter of the machine tool along a plurality of machining paths based on the generated control data according to a method according to one of the above-described aspects, the apparatus comprising first input means for providing a tooth flank geometry of at least one tooth flank of the tooth of the spur gear toothing, second input means for determining parameters for specifying a change of the provided tooth flank geometry according to the intended widthwise crowing of the tooth, and control data generating means for generating control data based on a tooth flank geometry which is changed based on the determined parameters, wherein the changed tooth flank geometry corresponds to a tooth flank geometry of the tooth having the intended widthwise crowing.

According to a fourth aspect of some disclosed examples, example apparatus are disclosed for generating control data for manufacturing a workpiece having a gear toothing, comprising input means for providing toothing information data, model calculation means for calculating a model of the workpiece based on the provided toothing information data, comprising calculating a provided tooth flank geometry based on the provided toothing information data, and control data generating means for generating control data for manufacturing the workpiece, comprising generating control data for forming a tooth of a spur gear toothing on the workpiece according to according to a method according to one or more of the above-described aspects.

Disclosed examples described below relate to apparatus according to the above-described third and fourth aspects.

In some preferred examples, disclosed example apparatus comprise model calculating means for calculating a model of the changed tooth flank geometry based on the provided tooth flank geometry and the determined parameters, in particular calculating a model of the tooth of the spur gear toothing based on the provided tooth flank geometry and the determined parameters.

In some preferred examples, disclosed example apparatus comprise third input means for determining one or more shift positions of the at least one tooth flank of the provided tooth flank geometry In some preferred examples, disclosed example apparatus comprise model displaying means for displaying a model of the changed tooth flank geometry. In some preferred examples, the model displaying means is further configured for displaying the provided tooth flank geometry, for displaying a raw part geometry of the workpiece, for displaying a geometry of the workpiece prior to forming the spur gear toothing and/or for displaying a finished part geometry of the workpiece after forming the spur gear toothing.

In some preferred examples, disclosed example apparatus comprise input means for inputting, determining or defining toothing information data or the first input means comprises input means for inputting, determining or defining toothing information data which may comprise inputting, determining or defining data being indicative of a size and shape of the workpiece, inputting, determining or defining data being indicative of a toothing shape, in particular indicative of a toothing shape of one of the toothing shapes including a straight toothing shape, a helical toothing gear shape and a spiral toothing shape, inputting, determining or defining data being indicative of a profile shape of the tooth flank, in particular indicative of a profile shape of one of the profile shapes including an involutes profile shape, a cycloidal profile shape and a circular profile shape, inputting, determining or defining data being indicative of a size and shape of a tooth geometry of the gear toothing, and/or inputting, determining or defining data being indicative of a number of teeth of the gear toothing.

According to a fifth aspect of some disclosed examples, example numerically controlled machine tools are disclosed having at least 5 axes, in particular universal machine tool, for milling a workpiece by successively moving a milling cutter of the machine tool along a plurality of machining paths based on the generated control data, the machine tool comprising an apparatus according to one or more of the above-described third or fourth aspects.

According to a sixth aspect of some disclosed examples, an example computer program product is disclosed comprising a computer-readable recording medium and computer program means recorded thereon, the computer program means being adapted for causing a data processing means of a data processing apparatus to execute the method of at least one of the above-described aspects.

FIG. 1 shows an example schematic perspective view of a tooth 1 of a spur gear toothing of a workpiece, here, for example, according to a straight toothing. The tooth 1 in FIG. 1A comprises a tooth root 1a, a tooth head 1b, and tooth flanks including tooth flank 1c, wherein the tooth flank 1c extends between tooth root 1a and tooth head 1b. During the later use of the spur gear, an opposite flank of an opposite spur gear rolls off at the tooth flank 1c. Tooth flank 1c is sometimes referred to as active toothing area of the side face of the tooth 1c.

The tooth flank 1c may correspond to the surface area of the tooth 1 which exhibits a mathematically exact tooth flank profile according to a mathematically exact tooth flank geometry. In areas close to the tooth root 1a and the tooth head 1b, the shape of the tooth 1 may differ from the mathematically exact provided tooth flank geometry of the mathematically exact provided tooth flank profile so that such areas may not be part of the active toothing area, i.e. of the tooth flank 1c. In the following, it will be presumed that the tooth flank 1c is the part that has a profile according to the toothing active tooth flank profile.

The tooth 1 of FIG. 1 has the tooth flank according to the provided tooth flank geometry prior to modifying or changing the tooth flank geometry. In particular, tooth 1 has the same mathematically exact tooth flank profile shape (here, exemplarily, an involutes profile shape) along the whole width of the tooth 1. The tooth thickness of the tooth 1 in the pitch direction is constant in FIG. 1 so that tooth 1 does not yet exhibit widthwise crowning.

It is possible to calculate a geometrical model of the tooth flank 1c of a spur gear toothing, for example, by means of a CAD system, insofar required toothing information data is provided, determined or input. For example, the following toothing information data may, in particular, be useful for calculating a mathematical or numerical model of the tooth flank 1:

data being indicative of a size and shape of the workpiece prior to and/or after machining (e.g., data for calculating a raw part geometry of the workpiece and/or finished part geometry of the workpiece or a model of a raw part geometry of the workpiece and/or finished part geometry of the workpiece), data being indicative of a toothing shape (toothing type), in particular, data indicative of a toothing shape of one of the toothing shapes including a straight toothing shape, a helical toothing gear shape, a circular toothing shape and a spiral toothing shape or the like, data being indicative of a tooth profile shape of the tooth flank, in particular, data indicative of a tooth profile shape of one of the tooth profile shapes including an involutes profile shape, a cycloidal profile shape and a circular profile shape or the like, data being indicative of a size and/or shape of a tooth geometry of the gear toothing, in particular, data indicative of tooth height, tooth thickness, tooth width or similar parameters, and/or data being indicative of a number of teeth of the gear toothing.

Based on the above-mentioned data it is possible to calculate or generate a mathematically exact model of the toothing or the workpiece comprising the toothing, the toothing having tooth flanks or a tooth flank 1c corresponding to a mathematically exact tooth flank geometry, which in particular has a mathematically exact tooth flank profile according to the indicated tooth profile shape of the tooth flank such as, e.g., an involutes profile shape.

Starting from such a calculated model, e.g., a model calculated by means of a CAD (CAD for computer aided design) system, it is further possible to calculate machining path data based on the model, for example for generating an NC program (NC for numerical control) or parts of an NC program, e.g., by means of a CAM or CAD/CAM system (CAM for computer aided manufacturing). The machining path data being comprised in control data on the basis of which tools such as end mill cutters or the like can be controlled at a numerically controlled machine tool having at least 5 axes such as, e.g., a milling machine tool, a universal milling machine tool or a machining center. The tool can be controlled so as to form the tooth flank 1c on the workpiece by successively moving the tool along machining paths indicated by the machining path data, in particular by moving the tool line-by-line along parallel lines of machining paths. Reference is made to the teachings of DE 10 2009 008 124 which describes how such machining paths can preferably, but not necessarily, be generated based on a provided tooth flank geometry.

According to some disclosed examples, the control data is not generated based on the provided tooth flank geometry, which is a mathematically exact or theoretical tooth flank profile or tooth flank geometry, but the control data is generated based on a changed tooth flank geometry which is changed or modified prior or during generating the control data in order to advantageously model a widthwise crowning of the tooth possibly even prior to first processing of the workpiece. Consequently, an intended widthwise crowning of the tooth can be achieved in a simple and efficient manner without the requirement of inconvenient and time consuming post-processing of the workpiece for modeling the intended widthwise crowning of the tooth after processing of the workpiece at the machine tool.

Modeling the widthwise crowning and modifying/changing the tooth flank geometry for modeling the widthwise crowning will be described in the following with reference to the FIGS. 1 to 5 according to some preferred examples.

In FIG. 1, tooth 1 has a tooth height $1f$, wherein at a level of half of the tooth height $1f$ there is defined a pitch circle $1d$ corresponding to a circle about the rotational axis of the spur gear toothing having a radius corresponding to the sum of the radius of the inner basic part of the workpiece and half of the tooth height $1f$. An intersection surface $1e$ is shown in FIG. 1 which, for example, corresponds to an intersection surface of the tooth 1 extending along a cylindrical surface at the level of the pitch circle $1d$, wherein the axis of the cylindrical surface is coaxially arranged with respect to the rotational axis of the spur gear toothing. Accordingly, intersection surface $1e$ extends along the pitch circle $1d$ according to this disclosed example. However, examples disclosed herein are not so limited to cylinder-surface shaped intersection surfaces; see for example the disclosed examples described with respect to FIG. 5.

The intersection surface $1e$ together with the tooth flank $1c$ define a straight flank curve 7 at the level of the pitch circle $1d$, i.e., at a level half of the height between tooth root $1a$ and tooth head $1b$.

Figure 2:
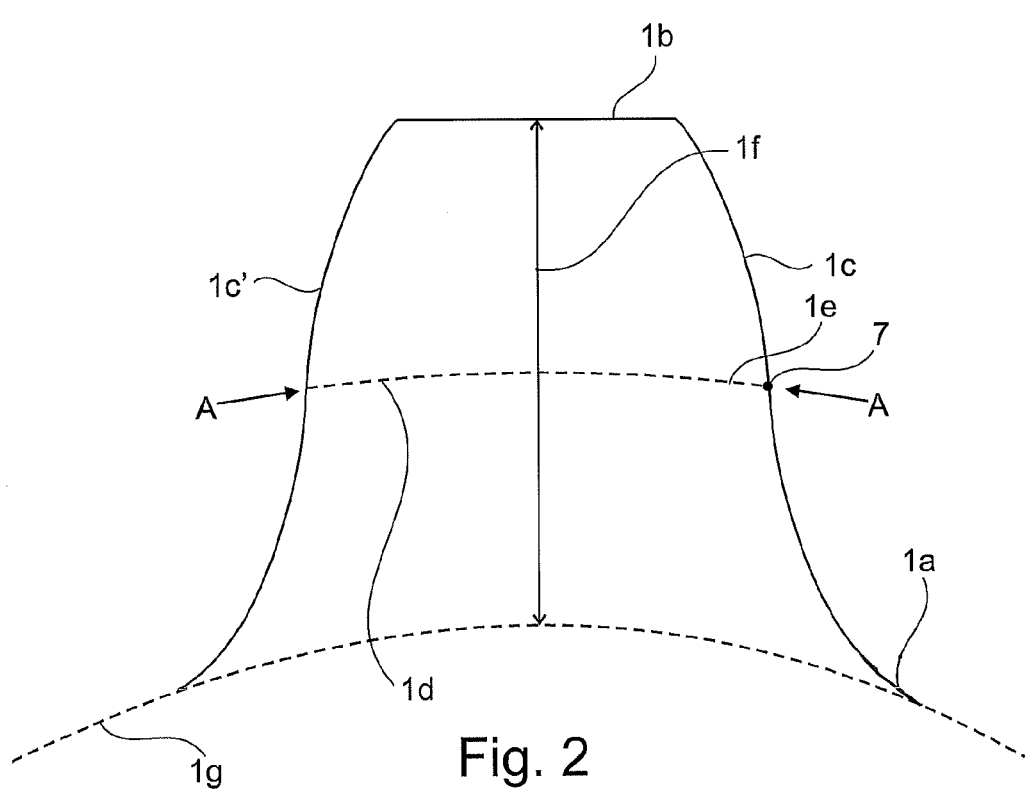
FIG. 2 shows an example schematic cross-sectional view of the tooth of FIG. 1.

FIG. 2 shows an example schematic cross-sectional view of the tooth of FIG. 1. Accordingly, tooth 1 has a tooth flank $1c$ according to the provided tooth flank geometry. Reference numeral $1g$ describes the extent of the inner basic part of the spur gear, i.e. a circle at the level of the tooth root $1a$. The opposite tooth flank $1c'$ of the same tooth 1 is illustrated as well.

Figure 3:
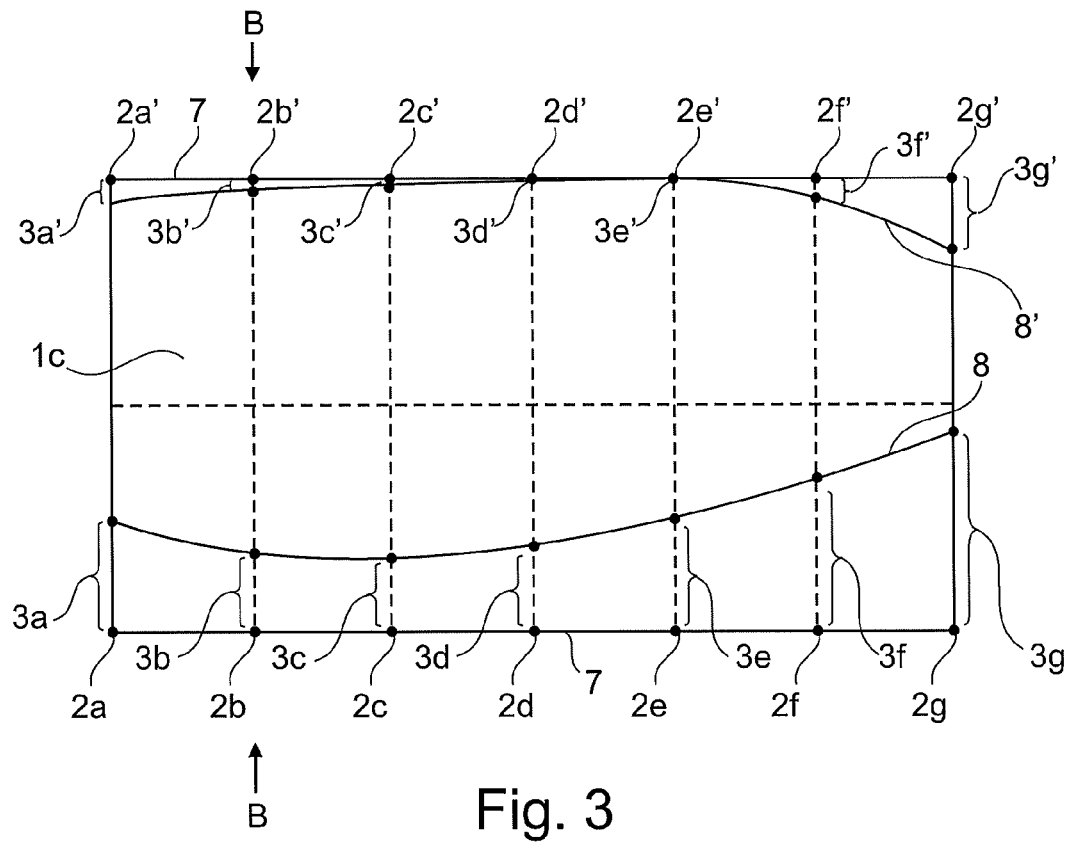
FIG. 3 shows an example schematic view of an intersection surface of the tooth along intersection surface A-A of FIG. 2.

FIG. 3 shows an example schematic view of an intersection surface $1e$ of the tooth 1 along intersection surface A-A of FIG. 2. For example, intersection surface $1e$ extends along a circular line according to the pitch circle $1d$ and not along a straight line.

On the flank curve 7 there are defined shift positions $2a$, $2b$, $2c$, $2d$, $2e$, $2f$, and $2g$. These can be pre-defined or the positions can be input by a user by inputting parameters for determining the shift positions on the flank curve 7. Such parameters can be input by inputting distances from shift positions $2a$ to $2g$ to their respective adjacent shift positions and/or by inputting distances from shift positions $2a$ to $2g$ to the outer edges of the tooth flank curve 7.

For defining an intended shift of the tooth flank geometry, the tooth flank or the flank curve 7 at the level of the pitch circle, there are defined or determined shift parameters $3a$ to $3g$ respectively for each of the shift positions $2a$ to $2g$.

Accordingly, a shift of the flank is defined at the level of the pitch circle according to a modified flank curve 8. In some preferred examples, flank curve 8 represents an interpolated curve that intersects positions defined by the respective shift parameters such that transitions at the positions are evenly shaped and continuous and, in particular, preferably, but not necessarily, tangential at the transition positions.

In an analogous manner, shift positions $2a'$ to $2g'$ are defined on the flank curve 7' on the opposite tooth flank $1c'$ for which respective shift parameters $3a'$ to $3g'$ can be determined or defined. Accordingly, also for the opposite tooth flank $1c'$ there are obtained positions of a modified tooth flank curve 8' that is shifted according to the shift parameters $3a'$ to $3g'$.

The obtained modified tooth flank curves 8 and 8' define the shape of the changed tooth flank geometry at the level of the pitch circle $1d$. Accordingly, in this disclosed example, it is only necessary to define parameters for modifying the tooth flank geometry at the level of the pitch circle. The change of the whole tooth flank geometry can be performed in a simple and efficient manner according to a concept that will be described in the following with reference to FIG. 4.

Figure 4:
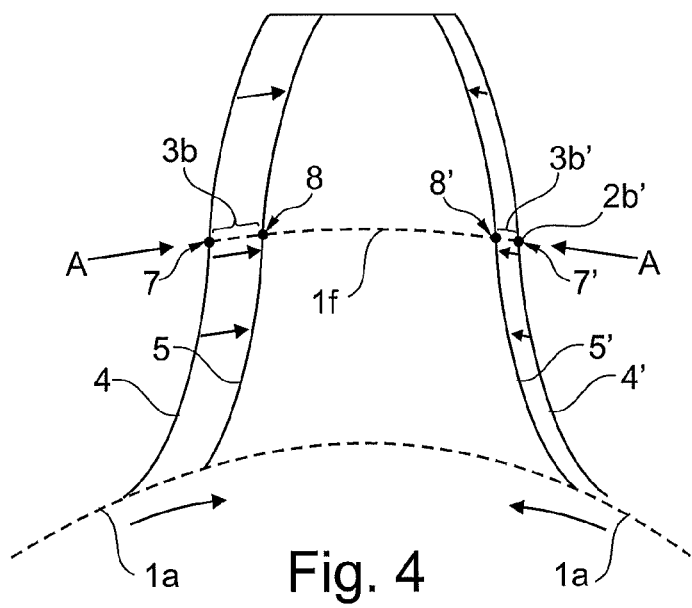
FIG. 4 shows an example schematic cross-sectional view of the tooth for illustrating the shift of the tooth profile according to one or more disclosed examples.

FIG. 4 shows an example schematic cross-sectional view of the tooth 1 along section B-B in FIG. 3 for illustrating the shift of the tooth profile according to some disclosed examples.

As shown in FIG. 3, the shift or retraction of the respective tooth flanks $1c$ and $1c'$ is, for example, defined or determined at the level of the pitch circle by determining the shift parameters $3b$ and $3b'$ at the defined shift positions $2b$ and $2b'$. The intersection positions of flank curves 7 and 7' as well as 8 and 8' are also shown.

Reference numeral 4 illustrates the tooth profile of tooth flank $1c$ and reference numeral 4' illustrates the tooth profile of tooth flank $1c'$.

The changed tooth flank geometry of tooth flanks $1c$ and $1c'$ can be obtained by rotating or rotationally shifting tooth flank profiles 4 and 4' in accordance with the shift parameters $3b$ and $3b'$ defined at the shift positions $2b$ and $2b'$ into the direction of the arrows illustrated in FIG. 4 by a rotation about the rotational axis of the spur gear toothing until the respective tooth flank profiles intersect with the modified flank curves 8 and 8', respectively.

Consequently, by means of a rotational shift of the profiles at the shift positions, it becomes possible to shift the whole tooth profiles in a simple and efficient manner by inputting only one respective shift parameter.

By rotation or rotational shift of the tooth flank profile, an advantage can be provided in that a later running behavior of the spur gear will still be optimal despite the formation of a widthwise crowning. At low load conditions, the teeth of the spur gear toothing do only roll along a centric positioned line on the tooth flanks at the shift position of smallest rotation or the shift position corresponding to the smallest shift parameter. At higher loads, the tooth flanks are generally deformed according to the increased load, wherein portions of the tooth flank that are obtained by larger rotations corresponding to larger shift parameters are coming in contact with the opposite rolling tooth flanks due to the deformation. Because of the rotational shift of the tooth profiles in these portions according to FIG. 4, there can be still provided an optimal rolling behavior of the spur gears despite the formed widthwise crowning at higher loads.

In the above disclosed example, the shift parameters are, for example, defined at the level of the pitch circle. Examples disclosed herein are, however, not so limited and shift parameters can also be defined at other levels in other examples, for example, at the level of the tooth root or at the level of the tooth head.

Figure 5:
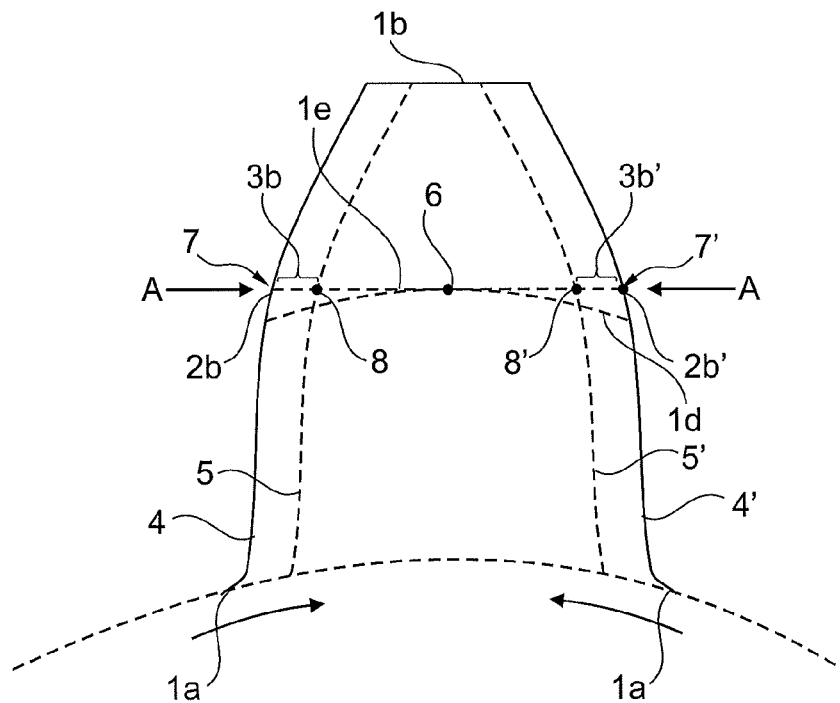
FIG. 5 shows an example schematic cross-sectional view of the tooth for illustrating the shift of the tooth profile according to another one or more disclosed examples.

FIG. 5 shows an example schematic cross-sectional view of a tooth 1 for illustrating the shift of the tooth profile according to another disclosed example. In this disclosed example, the intersection surface $1e$, which defines the flank curve 7 at the intersection with the tooth flank 1 and the flank curve 7' at the intersection with the tooth flank 1', is given by an intersection plane, which is oriented tangentially with respect to the pitch circle, in particular centrically coming into contact with the pitch circle tangentially at a point 6 so that the intersection surface 1e is oriented horizontally with respect to tooth 1, i.e. extending at a constant height through tooth 1.

As shown in FIG. 5, the shift positions 2b and 2b' are not defined exactly at the level of the pitch circle according to this disclosed example but still substantially at the level of the pitch circle. The procedure of rotational shift of the tooth profile at the respective shift positions can be performed analogously to the rotational shift as illustrated with reference to FIG. 4.

Figure 6:
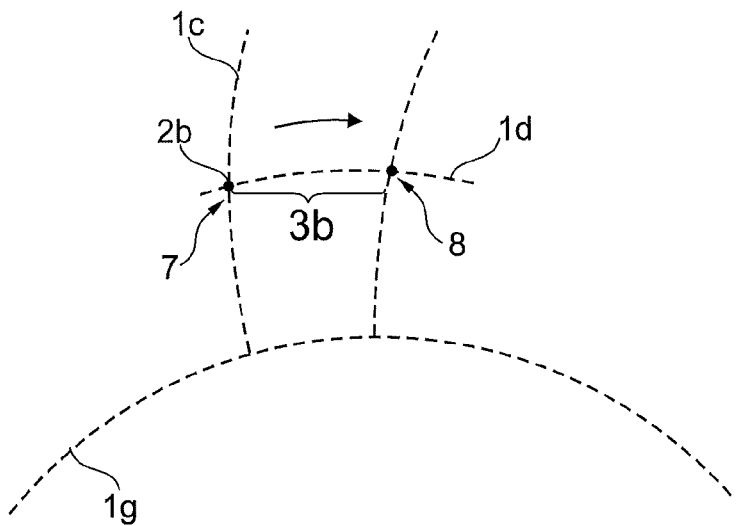
FIG. 6 illustrates an example rotational shift of a tooth profile according to one or more disclosed examples.

FIG. 6 illustrates an example rotational shift of a tooth profile according to one or more disclosed examples such as, for example, performed in the examples of FIGS. 4 and 5. Reference numeral 1g illustrates the outer surface line of the cylindrical inner base body of a model of the spur gear and reference numeral 1d illustrates the pitch circle of the spur gear toothing that is to be formed. At the shift position 2b (which is exemplarily positioned at the level of the pitch circle similar to FIG. 4), there is defined or determined a shift of the tooth flank 1 by means of shift parameter 3b. The modification or change of the tooth flank geometry at the shift position 2b is performed by a rotational shift as previously described with reference to FIGS. 4 and 5 in that the flank profile is rotated about the rotational axis 1h of the spur gear toothing or the spur gear by an amount corresponding to the value of the shift parameter.

Above, there are some disclosed examples illustrating a "sidewise" shift of tooth profiles that are performed by rotating the profile about the rotational axis of the spur gear base body at defined shift positions in correspondence with respectively defined shift parameters. Independent of that or also in addition to that, i.e., independent of or also in addition to the "sidewise" profile shift, the profile can also be shifted into the vertical direction of the tooth 1, i.e., in the direction of the tooth height and in the radial direction with respect to the rotational axis of the spur gear base body.

Figure 7A:
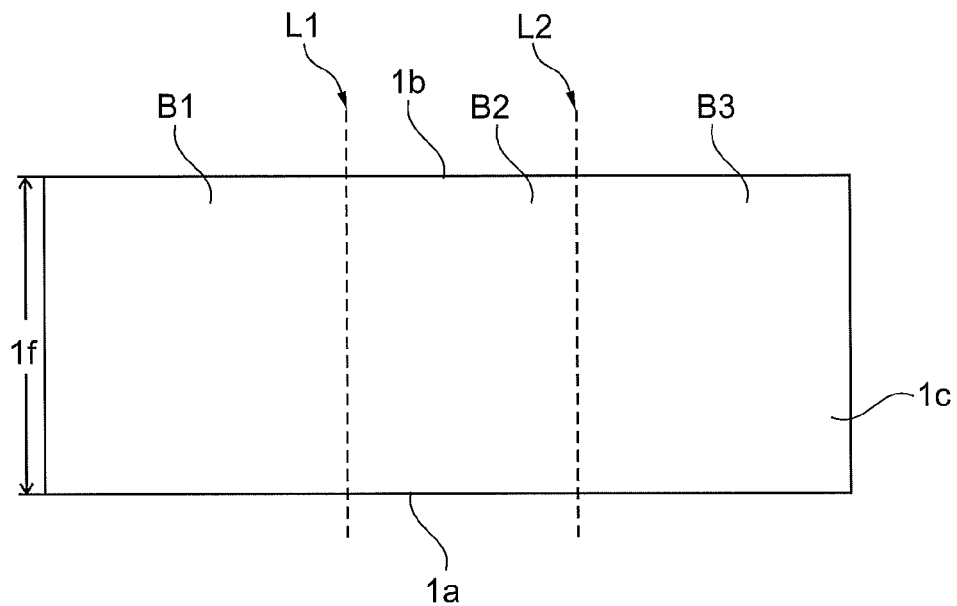
FIGS. 7A and 7B illustrate an example vertical shift of a tooth profile in the direction of the tooth height according to one or more disclosed examples.
Figure 7B:
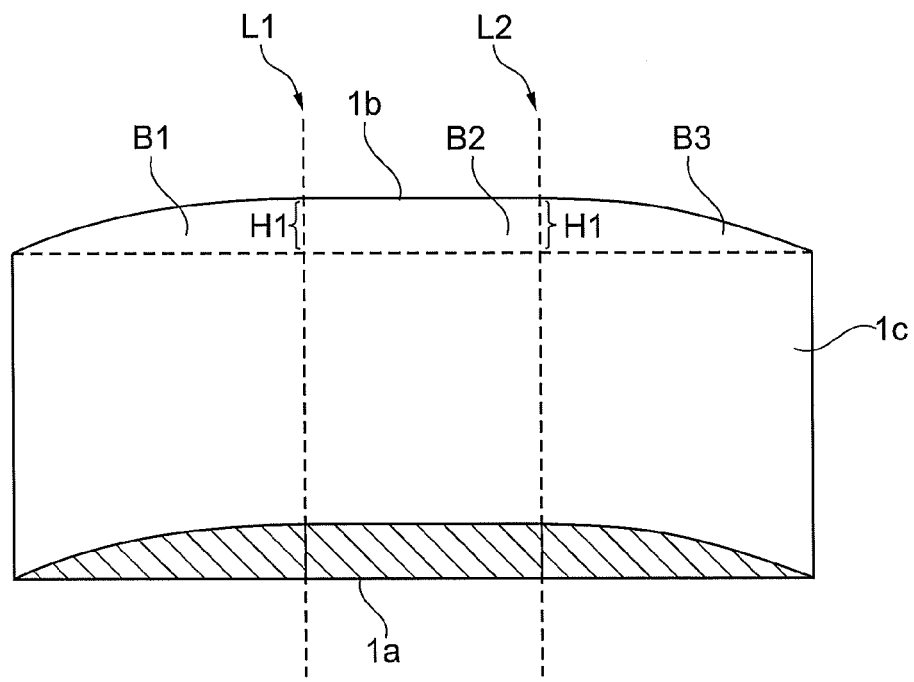

FIGS. 7A and 7B illustrate an example vertical shift of a tooth profile in the direction of the tooth height according to some disclosed examples. FIG. 7A shows a front view of a model of a tooth flank 1c of a tooth 1 of a spur gear toothing (see e.g. FIG. 1). The tooth 1 has a tooth height 1f. Reference numerals 1a and 1b again illustrate the tooth root 1a and the tooth head 1b. For performing a vertical shift of the tooth profile, there are determined or defined parameters for changing a provided tooth flank geometry. Exemplarily, tooth flank 1c is divided into three portions B1, B2 and B3 by means of the vertical lines L1 and L2 (or intersection planes L1 and L2 being oriented orthogonally with respect to the drawing plane). FIG. 7B illustrates a vertical shift of the tooth profile by inputting a height parameter H1 at the boundary between portions B1 and B2 at L1 and/or at the boundary between portions B2 and B3 at L2. Within the area of the middle portion B2, the profile is vertically shifted according to the amount corresponding to the defined height parameter H1.

Within the areas of the outer portions B1 and B3, the profile is vertically shifted such that the tooth height decreases towards the outer sides of the tooth flank 1c, for example, according to the shape of a circular curve (or an elliptical curve or another curve according to a mathematically defined function), the curves having tangential transitions at the boundaries from B1 to B2 at L1 or from B3 to B2 at L2. This results in a change of the tooth flank 1c and leads to a changed tooth flank geometry. Within the hatched area in FIG. 7B below the changed tooth flank 1c extending to the tooth root 1a, the tooth 1 may exhibit an arbitrary geometry such as, for example, according to the extended profile geometry or according to a radius which can be milled by means of an end mill cutter having an end radius.

As an alternative to inputting positions of the boundaries from B1 to B2 at L1 or from B3 to B2 at L2 and inputting the height parameter H1, as input parameters there can be used also radius parameters of one (i.e. symmetric for both portions B1 and B3) or two (asymmetric or independent for both portions B1 and B3) circular curves for defining or determining the circular tooth height reduction in the portions B1 and B3 which define the vertical shift of the tooth profile according to FIG. 7B.

Figure 8A:
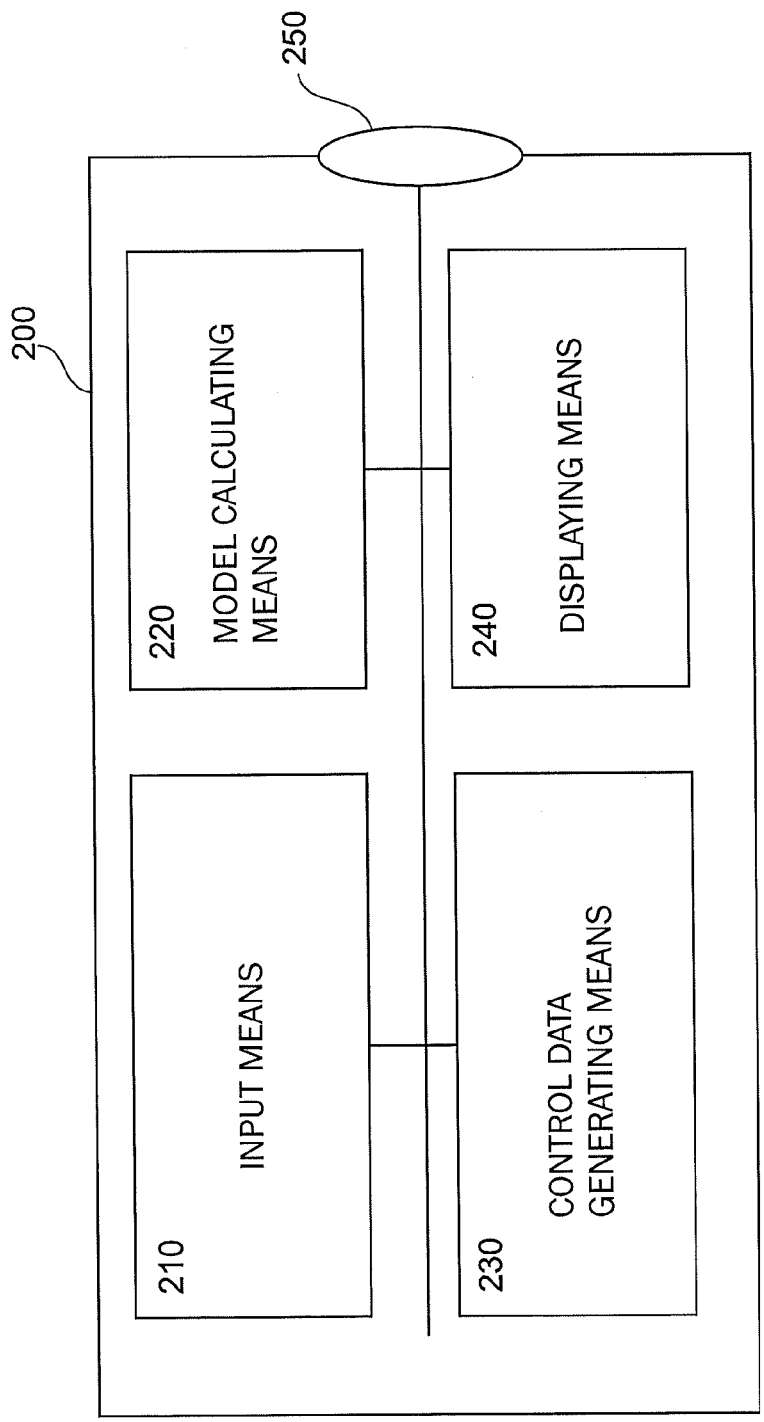
FIG. 8A shows an example schematic view of an example apparatus for generating control data according to some disclosed examples.

FIG. 8A shows an example schematic view of an apparatus 200 for generating control data for manufacturing a workpiece having a spur gear toothing or for generating control data according to some disclosed examples. The apparatus 200 is configured to generate control data for forming a tooth or tooth flank of a spur gear toothing which has an intended widthwise crowning by milling a workpiece at a numerically controlled machine tool having at least 5 axes, in particular at a universal machine tool such as a milling machine tool, a universal milling machine tool or a machining center, by successively moving a milling cutter of the machine tool along a plurality of machining paths based on the generated control data. The apparatus 200 may be part of a machine tool, i.e., it may be comprised in a machine tool or be fixed or connected to the machine tool, or it can be also provided separately.

The apparatus 200 may be rendered by one or more data processing means such as one or more computers or computer-like data processing devices. The apparatus 200 comprises input means 210 for inputting data, parameters, information or the like and, in particular, for inputting toothing information data, and model calculating means 220 for calculating a model of a workpiece based on toothing information data and, in particular, for calculating a model of a provided tooth flank geometry based on toothing information data.

Furthermore, apparatus 200 comprises control data generating means 230 for generating control data for manufacturing a workpiece and, in particular, for generating control data for forming a tooth of a spur gear toothing on the workpiece at a numerically controlled machine tool being controlled according to the control data.

According to this disclosed example, the apparatus 200 comprises displaying means 240 for displaying a model of the changed tooth flank geometry, for displaying a model of the provided tooth flank geometry, for displaying a raw part geometry of the workpiece prior to forming the spur gear toothing, for displaying a finished part geometry of the workpiece after forming the spur gear toothing.

Furthermore, apparatus 200 comprises interface means 250 by which the apparatus 200 can be connected for transmitting control data to the machine tool or a machine tool control device of the machine tool, e.g., according to a wired connection or a wireless connection such as, e.g., WLAN. The interface means 250 may further be configured to store generated control data on a storage medium such as, e.g., a USB memory stick, a flash memory card or the like, wherein the storage medium may be further connectable to the machine tool for transmitting the control data to the machine tool.

Figure 8B:
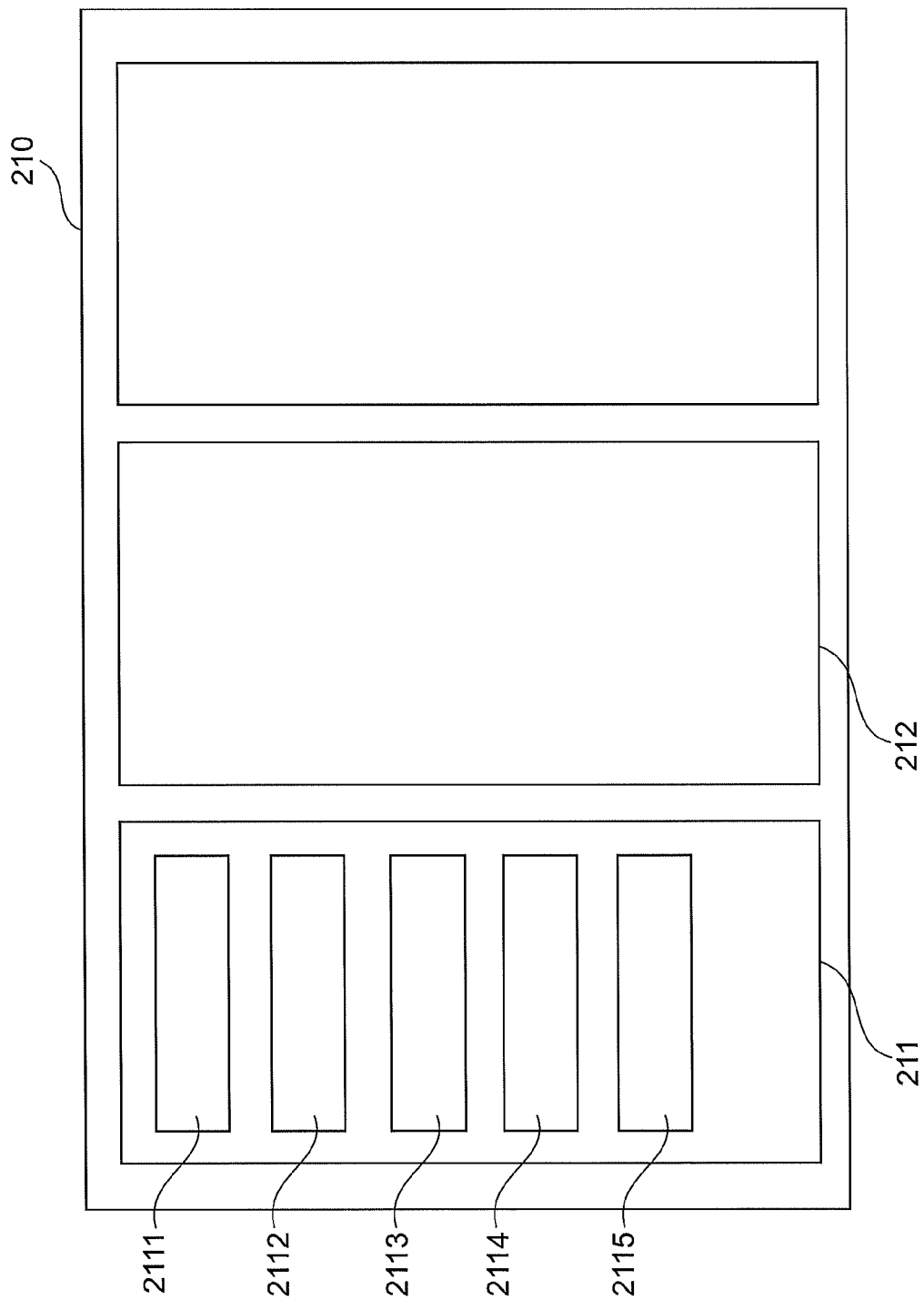
FIG. 8B shows an example schematic view of an input means of the example apparatus of FIG. 8A.

FIG. 8B shows an example schematic view of an input means 210 of the apparatus 200 of FIG. 8A according to some disclosed examples. Input means 210 comprises first input means 211 for defining or providing a tooth flank geometry (provided tooth flank geometry), second input means 212 for defining or determining shift parameters, and third input means 213 for defining or determining shift positions. Input means 212 and 213 render the input means for determining or inputting parameters for specifying a change of the provided tooth flank geometry.

The first input means 210 for defining or providing a tooth flank geometry or even a whole workpiece geometry comprising a tooth flank geometry comprises input means 2111 for inputting data being indicative of a size and shape of the workpiece, input means 2112 for inputting data being indicative of a toothing shape (toothing type), in particular indicative of a toothing shape of one of the toothing shapes including a straight toothing shape, a helical toothing gear shape and a spiral toothing shape, input means 2113 for inputting data being indicative of a profile shape of the tooth flank, in particular indicative of a profile shape of one of the profile shapes including an involutes profile shape, a cycloidal profile shape and a circular profile shape, input means 2114 for inputting data being indicative of a size and shape of a tooth geometry of the gear toothing, and input means 2115 for inputting data being indicative of a number of teeth of the gear toothing.

Based on the parameters inputted or defined by means of the input means 210, the model calculating means 220 is enabled to calculate a model of the workpiece having the toothing and, in particular, a model of the of the changed or modified tooth flank geometry or changed or modified tooth flank geometries. Based on the calculated model, the control generating means 230 is enabled to generate control data including machining path data for a milling cutter for successively and, in particular, line-by-line milling the tooth flank of the tooth of the spur gear toothing in correspondence with the changed tooth flank geometry. Then, it is possible to generate control data based on the machining path data numerically or automatically, e.g., control data provided as an NC-program or parts of an NC-program.

Summarizing, examples disclosed herein allow to further simplify the machining, processing or manufacturing of workpieces having a spur gear toothing and to expand the capabilities of milling a workpiece at a numerically controlled machine tool comprising at least 5 axes, in particular at universal machine tools such as milling machine tools, universal milling machine tools or machining centers. In particular, example methods and apparatus are disclosed for generating control data which improves the application spectrum of the newly developed unconventional methods for manufacturing workpieces having a gear toothing at numerically controlled machine tools comprising at least 5 axes, in particular at universal machine tools, in which the gear toothing on the workpiece is formed by successive machining, and in particular line-by-line machining, of a tooth flank on the workpiece based on the generated control data. Finally, examples disclosed herein further enable simple and efficient manufacturing of a workpiece having a spur gear toothing such that at least one tooth of the workpiece is formed according to an intended crowning, in particular, without the requirement of post-processing.

What is claimed is:

1. A method for generating control data for forming a tooth of a spur gear toothing which has an intended widthwise crowning by milling a workpiece at a numerically controlled machine tool having at least 5 axes by successively moving a milling cutter of the machine tool along a plurality of machining paths based on the generated control data, the method comprising:
   providing a tooth flank geometry of at least one tooth flank of the tooth of the spur gear toothing,
   determining parameters, which include a plurality of shift parameters, for specifying a change of the provided tooth flank geometry according to the intended widthwise crowning of the tooth, each shift parameter being associated with one of plural shift positions of the at least one tooth flank of the provided tooth flank geometry, and
   generating, by a processor, control data based on a tooth flank geometry which is changed based on the determined parameters, wherein the changed tooth flank geometry corresponds to a tooth flank geometry of the tooth having the intended widthwise crowning,
   wherein the changed tooth flank geometry is retracted, at each of the plural shift positions, by an amount according to the respective associated shift parameter relative to the provided tooth flank geometry by changing the provided tooth flank geometry such that the tooth profile of the tooth flank is shifted, at each of the plural shift positions, by rotating the tooth profile about the rotational axis of the spur gear toothing according to the respective determined shift parameter.

2. A method according to claim 1, wherein generating the control data comprises at least one of:
   calculating a model of the changed tooth flank geometry based on the provided tooth flank geometry and the determined parameters, or
   calculating a model of the tooth of the spur gear toothing based on the provided tooth flank geometry and the determined parameters.

3. A method according to claim 1, wherein the parameters for changing the tooth flank geometry are determined such that a tooth having the changed tooth flank geometry exhibits the intended widthwise crowning.

4. A method according to claim 1, wherein the plural shift positions are defined on a tooth flank curve of the at least one tooth flank, the tooth flank curve corresponding to a line of intersection of an intersection surface of the tooth and the at least one tooth flank of the provided tooth flank geometry.

5. A method according to claim 4, wherein the intersection surface of the tooth is an intersection plane, in particular a horizontal intersection plane.

6. A method according to claim 5, wherein the intersection plane is oriented tangential to a pitch circle of the spur gear toothing, in particular wherein the intersection plane is oriented tangential to the pitch circle of the spur gear toothing at a centric position of the intersection plane.

7. A method according to claim 4, wherein the intersection surface of the tooth extends along a cylindrical surface, an axis of the cylindrical surface being oriented coaxially with respect to a rotational axis of the spur gear toothing.

8. A method according to claim 7, wherein the intersection surface of the tooth extends along a pitch circle of the spur gear toothing.

9. A method according to claim 1, wherein the plural shift positions are defined substantially at the same level as a pitch circle of the spur gear toothing.

10. A method according to claim 1, further comprising displaying a model of the changed tooth flank geometry.

11. A method according to claim 1, wherein providing the tooth flank geometry comprises:
   providing toothing information data, and
   calculating the provided tooth flank geometry based on the provided toothing information data.

12. A method according to claim 11, wherein the toothing information data comprises at least one of:
   data indicative of a size and shape of the workpiece,
   data indicative of a toothing shape including at least one of a straight toothing shape, a helical toothing gear shape or a spiral toothing shape, data indicative of a profile shape of a tooth flank including at least one of an involutes profile shape, a cycloidal profile shape or a circular profile shape, data indicative of a size and shape of a tooth geometry of the gear toothing, or data indicative of a number of teeth of the gear toothing.

13. A non-transitory computer-readable medium having instructions stored thereon that, when executed, cause a machine to perform the method of claim 1.

14. An apparatus for generating control data for forming a tooth of a spur gear toothing which has an intended widthwise crowning by milling a workpiece at a numerically controlled machine tool having at least 5 axes by successively moving a milling cutter of the machine tool along a plurality of machining paths based on the generated control data, the apparatus comprising:

first input means for providing a tooth flank geometry of at least one tooth flank of the tooth of the spur gear toothing, second input means for determining parameters, which include a plurality of shift parameters, for specifying a change of the provided tooth flank geometry according to the intended widthwise crowning of the tooth, each shift parameter being associated with one of plural shift positions of the at least one tooth flank of the provided tooth flank geometry, and control data generating means for generating control data based on a tooth flank geometry which is changed based on the determined parameters, wherein the changed tooth flank geometry corresponds to a tooth flank geometry of the tooth having the intended widthwise crowning, wherein the changed tooth flank geometry is retracted, at each of the plural shift positions, by an amount according to the respective associated shift parameter relative to the provided tooth flank geometry by changing the provided tooth flank geometry such that the tooth profile of the tooth flank is shifted, at each of the plural shift positions, by rotating the tooth profile about the rotational axis of the spur gear toothing according to the respective determined shift parameter.

15. A numerically controlled machine tool having at least 5 axes for milling a workpiece by successively moving a milling cutter of the machine tool along a plurality of machining paths based on the generated control data, the machine tool comprising an apparatus according to claim 14.

* * * * *